United States Patent
Oobuchi et al.

(10) Patent No.: US 10,891,765 B2
(45) Date of Patent: Jan. 12, 2021

(54) INFORMATION PROCESSING APPARATUS AND INFORMATION PROCESSING METHOD

(71) Applicant: SONY CORPORATION, Tokyo (JP)

(72) Inventors: Yukio Oobuchi, Kanagawa (JP); Naoki Ide, Tokyo (JP); Akira Fukui, Kanagawa (JP); Yoshiyuki Kobayashi, Tokyo (JP); Shingo Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 69 days.

(21) Appl. No.: 16/081,235

(22) PCT Filed: Jan. 20, 2017

(86) PCT No.: PCT/JP2017/001903
§ 371 (c)(1),
(2) Date: Aug. 30, 2018

(87) PCT Pub. No.: WO2017/179258
PCT Pub. Date: Oct. 19, 2017

(65) Prior Publication Data
US 2019/0035122 A1     Jan. 31, 2019

(30) Foreign Application Priority Data

Apr. 11, 2016  (JP) .................................. 2016-079006

(51) Int. Cl.
*G06T 11/20* (2006.01)
*G06F 3/0481* (2013.01)
(Continued)

(52) U.S. Cl.
CPC .......... *G06T 11/206* (2013.01); *G06F 3/0481* (2013.01); *G06F 16/00* (2019.01);
(Continued)

(58) Field of Classification Search
None
See application file for complete search history.

(56) References Cited

U.S. PATENT DOCUMENTS 8,107,690 B2 * 1/2012 Funaki ............... G06K 9/00221
382/118
10,521,692 B2 * 12/2019 Wang ................. G06K 9/00617
(Continued)

OTHER PUBLICATIONS

Title: Mining Multilevel Image Semantics via Hierarchical Classification, Author: Fan et al., Date: Feb. 2008, 21 pages (p. 167-187), Source: IEEE Transactions on Multimedia, vol. 10, No. 2, Web Link: https://ieeexplore.ieee.org/stamp/stamp.jsp?tp=&arnumber=4432620 (Year: 2008).*

*Primary Examiner* — Jwalant Amin
(74) *Attorney, Agent, or Firm* — Paratas Law Group, PLLC

(57) ABSTRACT

There is provided an information processing apparatus and an information processing method, the information processing apparatus including: a display size decision unit configured to decide a display size of data that is based on learning of a label corresponding to a class, on the basis of a distance between a position of the data arranged on the basis of a likelihood vector obtained by recognition of the data, and a position of a class to which the data belongs; and a communication control unit configured to cause the display size to be transmitted.

17 Claims, 12 Drawing Sheets

(51) Int. Cl.
*G06N 99/00* (2019.01)
*G06F 16/00* (2019.01)
*G06F 16/58* (2019.01)
*G06F 16/904* (2019.01)
*G06K 9/62* (2006.01)
*G06T 3/40* (2006.01)

(52) U.S. Cl.
CPC ........ *G06F 16/5866* (2019.01); *G06F 16/904* (2019.01); *G06K 9/628* (2013.01); *G06K 9/6269* (2013.01); *G06N 99/00* (2013.01); *G06T 3/40* (2013.01)

(56) References Cited

U.S. PATENT DOCUMENTS

| | | | |
|---|---|---|---|
| 2008/0235184 A1* | 9/2008 | Nakamura | G06F 16/583 |
| 2013/0125069 A1* | 5/2013 | Bourdev | G06F 3/04845 |
| | | | 715/863 |
| 2015/0006538 A1* | 1/2015 | Koike | G06F 3/0486 |
| | | | 707/740 |
| 2017/0132425 A1* | 5/2017 | Koch | G06F 16/5866 |

* cited by examiner

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2017/001903 (filed on Jan. 20, 2017) under 35 U.S.C. § 371, which claims priority to Japanese Patent Application No. 2016-079006 (filed on Apr. 11, 2016), which are all hereby incorporated by reference in their entirety.

TECHNICAL FIELD

The present disclosure relates to an information processing apparatus and an information processing method.

BACKGROUND ART

In recent years, a technology related to machine learning for performing classification and recognition is actively researched. Among technologies related to machine learning, for example, in supervised learning, learning is performed on the basis of training data (a combination of data and a label affixed to the data). In the supervised learning, it is desirable to prepare a large volume of training data for performing highly-accurate classification and recognition, but cost related to labeling can possibly increase for preparing a large volume of training data.

For example, Patent Literature 1 discloses a technology of saving cost related to labeling, by performing age estimation using image data in which not all input image data are labeled, but only partial representative data are labeled.

CITATION LIST

Patent Literature

Patent Literature 1: JP 2010-257409A

DISCLOSURE OF INVENTION

Technical Problem

In the machine learning field as described above, data is desired to be labeled more efficiently.

Solution to Problem

According to the present disclosure, there is provided an information processing apparatus including: a display size decision unit configured to decide a display size of data that is based on learning of a label corresponding to a class, on the basis of a distance between a position of the data arranged on the basis of a likelihood vector obtained by recognition of the data, and a position of a class to which the data belongs; and a communication control unit configured to cause the display size to be transmitted.

In addition, according to the present disclosure, there is provided an information processing apparatus including: a receiving unit configured to receive a display size of data that is based on learning of a label corresponding to a class, the display size having been decided on the basis of a distance between a position of the data arranged on the basis of a likelihood vector obtained by recognition of the data, and a position of a class to which the data belongs; and a processing unit configured to perform processing on the basis of the display size.

In addition, according to the present disclosure, there is provided an information processing method including: deciding, by a processor, a display size of data that is based on learning of a label corresponding to a class, on the basis of a distance between a position of the data arranged on the basis of a likelihood vector obtained by recognition of the data, and a position of a class to which the data belongs; and causing the display size to be transmitted.

In addition, according to the present disclosure, there is provided an information processing apparatus including: an input unit configured to receive a change of a display target; and a display size decision unit configured to decide, in response to the change of the display target, a display size of data that is based on learning of a label corresponding to a class, on the basis of a distance between a position of the data arranged on the basis of a likelihood vector obtained by recognition of the data, and a position of a class to which the data belongs.

In addition, according to the present disclosure, there is provided an information processing method including: receiving a change of a display target; and deciding, by a processor, in response to the change of the display target, a display size of data that is based on learning of a label corresponding to a class, on the basis of a distance between a position of the data arranged on the basis of a likelihood vector obtained by recognition of the data, and a position of a class to which the data belongs.

Advantageous Effects of Invention

As described above, according to the present disclosure, data can be labeled more efficiently.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
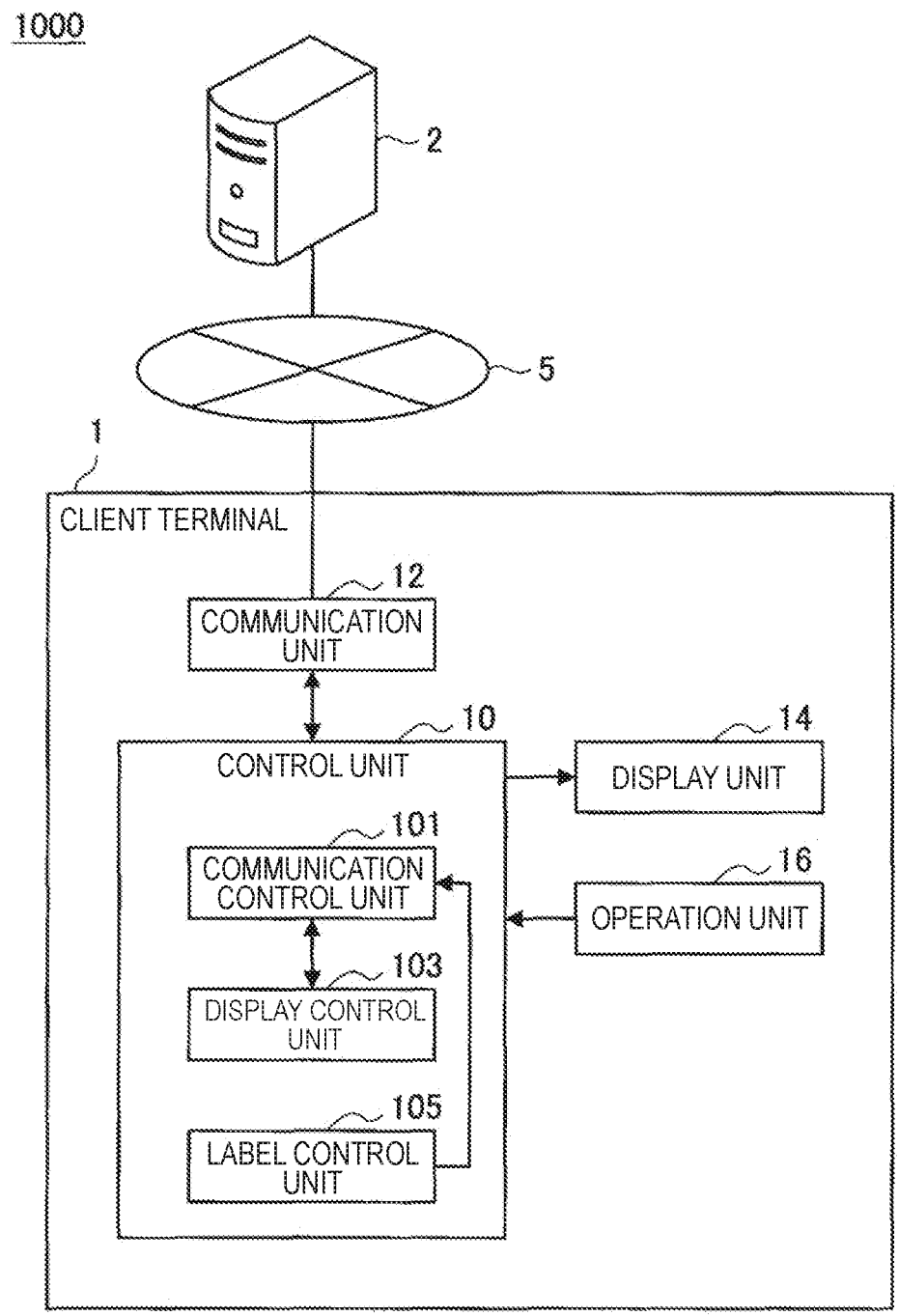
FIG. 1 is an explanatory diagram for describing a configuration example of an information processing system 1000 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, the description will be given in the following order.

<<1. Configuration example>>
   <1-1. Overall configuration>
   <1-2. Client terminal>
   <1-3. Server>
<<2. Operation example>>
   <2-1. Process flow>
   <2-2. Screen transition example>
<<3. Modified example>>
   <3-1. Modified example 1>
   <3-2. Modified example 2>
   <3-3. Modified example 3>
   <3-4. Modified example 4>
<<4. Hardware configuration example>>
<<5. Conclusion>>

1. CONFIGURATION EXAMPLE

First of all, a configuration example of an embodiment of the present disclosure will be described with reference to FIG. 1. FIG. 1 is an explanatory diagram for describing a configuration example of an information processing system 1000 according to an embodiment of the present disclosure. The information processing system 1000 according to the present embodiment is an information processing system for labeling data to be learned in machine learning.

The data according to the present disclosure is not specifically limited, and may be image data, voice data, text data, and the like, for example. Nevertheless, the following description will be given assuming that data to be learned and recognized in the present embodiment is image data. In addition, the following description will be given of an example in which, in the present embodiment, for constructing a classifier for classifying image data into a plurality of classes, a label indicating a class to which image data for learning belongs (e.g. a type of an object included in the image data) is affixed to the image data.

As illustrated in FIG. 1, the information processing system 1000 according to the present embodiment includes a client terminal 1, a server 2, and a communication network 5. In the following description, the overall configuration of the information processing system 1000 according to the present embodiment will be described, and then, configuration examples of the client terminal 1 and the server 2 that are included in the information processing system 1000 according to the present embodiment will be sequentially described.

1-1. Overall Configuration

The client terminal 1 is an information processing apparatus to be used by a user that performs labeling. The user performs labeling by granting a label to image data for learning that is displayed on the client terminal 1. Information regarding the label granted by the user (label information) is provided to the server 2 via the communication network 5. Note that, the image data for learning that is displayed by the client terminal 1 may be provided from the server 2 to the client terminal 1 via the communication network 5.

In addition, the client terminal 1 receives, from the server 2, graph information that visualizes a recognition result, and a display size of image data, and performs a display process on the basis of the graph information and the display size. As described later, image data displayed on the client terminal 1 is displayed largely as a possibility of a recognized class being false becomes higher. Thus, it becomes easier for the user to find data desired to be correctly labeled, and the user can efficiently perform labeling.

The server 2 is an information processing apparatus that performs learning of labeled image data, and recognition of image data. Note that, the labeled image data is so-called training data, and is obtained by associating the label information received from the client terminal 1 via the communication network 5, and image data with each other.

In addition, on the basis of a recognition result, the server 2 performs graph generation for display performed by the client terminal 1, and visualization of the recognition result, and decision of a display size of each piece of image data, and transmits the graph information and the display size to the client terminal 1. Note that, the configuration example of the server 2 will be described later with reference to FIG. 2.

The communication network 5 is a wired or wireless transmission path of information to be transmitted from a device or a system that is connected to the communication network 5. For example, the communication network 5 may include a public circuit network such as the Internet, a telephone circuit network, or a satellite communication network, various local area networks (LANs) including Ethernet (registered trademark), a wide area network (WAN), and the like. In addition, the communication network 5 may include a dedicated circuit network such as an internet protocol-virtual private network (IP-VPN).

1-2. Client Terminal

The overall configuration example of the information processing system 1000 according to the present embodiment has been described above. Subsequently, the configuration example of the client terminal 1 according to the present embodiment will be described. As illustrated in FIG. 1, the client terminal 1 according to the present embodiment is an information processing apparatus including a control unit 10, a communication unit 12, a display unit 14, and an operation unit 16. Note that, the client terminal 1 may be a personal computer (PC), a cellular phone, a smartphone, a tablet PC, or the like, for example, or may be a wearable device such as a head mounted display (HMD).

The control unit 10 controls each configuration of the client terminal 1. In addition, as illustrated in FIG. 1, the control unit 10 also functions as a communication control unit 101, a display control unit 103, and a label control unit 105.

The communication control unit 101 controls communication performed by the communication unit 12. For example, the communication control unit 101 controls the communication unit 12 to receive image data, graph information, a display size, and the like from the server 2. In addition, the communication control unit 101 controls the communication unit 12 to transmit label information to the server 2. Note that, label information may be generated by the label control unit 105, which % ill be described later, on the basis of an input of the user, for example.

The display control unit 103 controls display performed by the display unit 14 (performs processes related to display). For example, the display control unit 103 causes the display unit 14 to display image data received from the server 2. In addition, the display control unit 103 may cause the display unit 14 to display image data, further on the basis of graph information and a display size that are received from the server 2.

Note that, the details of screens to be displayed on the display unit 14 by the control of the display control unit 103, and screen transition examples will be described later with reference to FIGS. 4 to 10.

The label control unit 105 generates information regarding a label (label information), on the basis of an input of the user. For example, label information generated by the label control unit 105 may include a label, and information that associates the label and image data (e.g. identification information of image data). In this case, for example, the label control unit 105 may generate label information by associating image data displayed on the display unit 14, and an input of the user that is obtained via the operation unit 16. The label information generated by the label control unit 105 is transmitted to the server 2 by the communication control of the communication control unit 101.

The communication unit 12 (receiving unit) is a communication interface that mediates communication with another device. The communication unit 12 supports an arbitrary wireless communication protocol or a wired communication protocol, and establishes communication connection with another device via the communication network 5 illustrated in FIG. 1, for example. This enables the client terminal 1 to transmit label information to the server 2 connected to the communication network 5, and receive graph information and a display size from the server 2, for example.

The display unit 14 is a display that displays various screens by being controlled by the display control unit 103. For example, the display unit 14 may display a plurality of image data, or may display an input screen of labels. Note that, the display unit 14 may be implemented in various forms corresponding to the form of the client terminal 1.

The operation unit 16 (input unit) receives an input of the user, and provides the input to the control unit 10. For example, the user may operate the operation unit 16 and select image data to be labeled. Note that, the user may select one or a plurality of image data to be labeled. In addition, the user may operate the operation unit 16 and input a label to be granted to image data. In addition, the user may operate the operation unit 16 and input a change of a display target (e.g. enlargement, move, rotation, etc. of a display target range). Note that, the operation unit 16 may be implemented by a mouse, a keyboard, a touch panel, a button, a switch, a sight line input device, a gesture input device, a voice input device, or the like, for example.

1-3. Server

Figure 2:
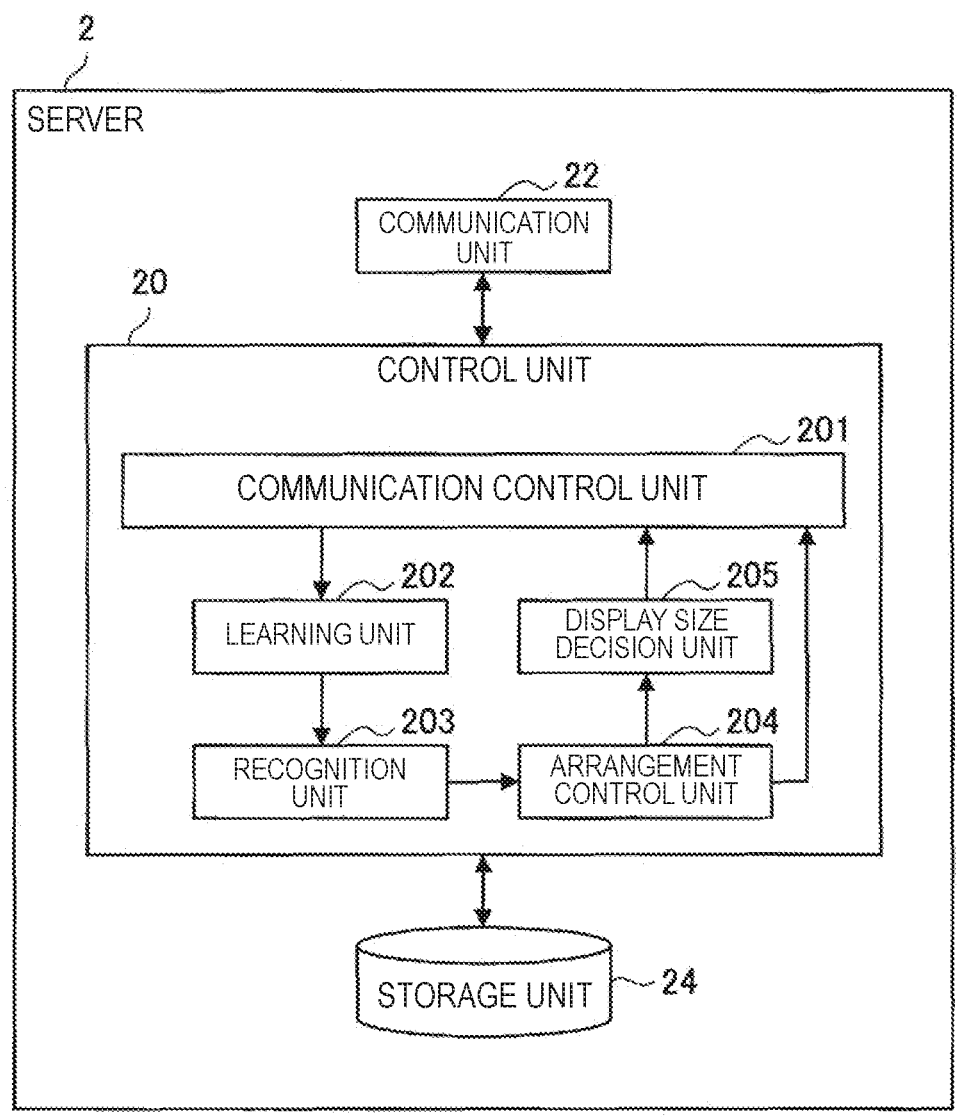
FIG. 2 is an explanatory diagram for describing a configuration example of a server 2 according to this embodiment.

The configuration example of the client terminal 1 according to the present embodiment has been described above. Subsequently, the configuration example of the server 2 according to the present embodiment will be described with reference to FIG. 2. FIG. 2 is an explanatory diagram for describing the configuration example of the server 2 according to the present embodiment. As illustrated in FIG. 2, the server 2 is an information processing apparatus including a control unit 20, a communication unit 22, and a storage unit 24.

The control unit 20 controls each configuration of the server 2. In addition, as illustrated in FIG. 2, the control unit 20 also functions as a communication control unit 201, a learning unit 202, a recognition unit 203, an arrangement control unit 204, and a display size decision unit 205.

The communication control unit 201 controls communication performed by the communication unit 22. For example, the communication control unit 201 controls the communication unit 22 to receive label information from the client terminal 1. In addition, the communication control unit 201 controls the communication unit 22 to transmit image data, graph information, a display size, and the like.

The learning unit 202 performs learning on the basis of labeled image data in which label information received from the client terminal 1 and image data are associated with each other. A method of learning performed by the learning unit 202 is not specifically limited, and may be a method that is based on a machine learning algorithm such as a neural network, a decision tree, and Support Vector Machine (SVM), for example. As a result of learning performed by the learning unit 202, for example, a classifier that classifies image data into any of a plurality of classes is constructed.

The recognition unit 203 performs recognition (classification) of image data on the basis of the learning result (classifier) obtained by the learning unit 202. A method of recognition performed by the recognition unit 203 may be a method corresponding to a machine learning algorithm used in the learning unit 202, for example. Note that, image data to be recognized by the recognition unit 203 can include unlabeled image data displayed on a screen of the client terminal 1.

For example, the recognition unit 203 according to the present embodiment may identify a likelihood vector including a likelihood indicating the extent to which each piece of image data is likely to be each class, and classify each piece of image data into any of the classes on the basis of the likelihood vector. For example, the recognition unit 203 may classify image data into a class corresponding to the highest likelihood in a likelihood vector related to the image data. In addition, in a case where a value of the highest likelihood in a likelihood vector related to image data is a predetermined threshold value or more, the recognition unit 203 may classify the image data into a class corresponding to the highest likelihood. Note that, in the following description, image data classified into a class will be sometimes referred to as image data belonging to the class.

The arrangement control unit 204 arranges image data on the basis of a likelihood vector in the recognition of image data that is performed by the recognition unit 203. For example, the arrangement control unit 204 may arrange each piece of image data by generating a graph that visualizes a recognition result, on the basis of the recognition result obtained by the recognition unit 203.

A method of graph generation performed by the arrangement control unit 204 is not specifically limited, and a graph generated by the arrangement control unit 204 may be a graph that is based on a mechanical model (force-directed graph), for example. In this case, the arrangement control unit 204 generates a graph by allocating force to a vertex and a side of the graph, and identifying a stable state in which mechanical energy is low. The following description will be given of graph generation performed by the arrangement control unit 204, using a case in which the arrangement control unit 204 generates a graph that is based on the mechanical model, as an example.

For example, the arrangement control unit 204 may set each class and each piece of image data as vertexes. In addition, the arrangement control unit 204 may set a side between each class and each piece of image data, and allocate force that is based on a likelihood vector of each piece of image data, to the side between each class and each piece of image data. Force to be allocated to a side between a class and image data may be set to become larger as a likelihood related to the class becomes larger, in a likelihood vector related to the image data. With this configuration, image data becomes more likely to be arranged at a position close to a class corresponding to a likelihood having a high value in a likelihood vector related to the image data. In addition, image data becomes more likely to be arranged away from a position of a class to which the image data belongs, as a possibility of the occurrence of false recognition becomes higher.

In addition, in a case where a plurality of classes exist, the arrangement control unit 204 may set a side between classes, and allocate force that is based on a similarity degree between the classes, to the side between the classes. For example, force to be allocated to a side between classes may be set to become larger as a similarity degree between the classes becomes larger. With this configuration, similar classes become more likely to be arranged at close positions, and image data belonging to the classes also become more likely to be arranged at close positions.

Note that, a similarity degree between classes may be identified on the basis of likelihood vectors of image data belonging to the classes, for example. For example, a similarity degree between a first class and a second class may be identified on the basis of an average value of likelihoods corresponding to the second class, in likelihood vectors of image data classified into the first class, or an average value of likelihoods corresponding to the first class, in likelihood vectors of image data classified into the second class. With this configuration, classes that are prone to be falsely recognized become more likely to be arranged at close positions, and image data classified into the classes also become more likely to be arranged at close positions. As a result, it becomes easier for the user to find data desired to be correctly labeled, and more efficient labeling is enabled.

In addition, the arrangement control unit 204 sets a circle having a center corresponding to a position of a class, and a radius corresponding to a distance between the class and image data located at a position farthest from the position of the class among image data classified into the class, as a crowd indicating a range of the class. Note that, in the following description, a radius of the above-described crowd (circle indicating the range of the class) will be sometimes referred to as a class radius. In addition, a crowd set by the arrangement control unit 204 may be displayed on the display unit 14 of the client terminal 1, for example.

Information regarding a graph (graph information) generated by the above-described arrangement control unit 204 is transmitted to the client terminal 1. For example, the graph information may include information such as positions of image data, a position of a class, and a radius of a crowd corresponding to the class. With this configuration, it becomes possible for the client terminal 1 to visualize a recognition result, and largely display image data having a high possibility of being falsely recognized, and it becomes easier for the user to find data desired to be correctly labeled.

The display size decision unit 205 decides a display size of image data on the basis of a distance between a position of the image data arranged by the arrangement control unit 204, and a position of a class to which the image data belongs. For example, the display size decision unit 205 may decide the display size such that the display size of the image data becomes larger as the distance becomes larger. With this configuration, a display size of image data having a lower likelihood and a higher possibility of being falsely recognized becomes larger, and it becomes further easier for the user to find data desired to be correctly labeled.

In addition, the display size decision unit 205 may decide the display size further on the basis of the above-described class radius. For example, the display size decision unit 205 may decide the display size such that the display size becomes larger as a ratio of the distance with respect to the class radius becomes larger. With this configuration, a display size is normalized by a class radius, and for example, even if image data belongs to a class having a small class radius, if the image data has a high possibility of being falsely recognized, the image data is largely displayed.

In addition, the display size decision unit 205 may decide the display size such that, in a case where the distance related to image data, or a ratio of the distance with respect to the class radius is larger than a predetermined threshold value, the display size becomes larger than that of other image data. In this case, image data in an outer rim portion of a crowd (circle indicating the range of a class) are largely displayed, and the other image data are displayed small. With this configuration, for example, in a case where there are a number of image data, image data to be largely displayed are narrowed down, and it becomes further easier for the user to find data desired to be correctly labeled.

The communication unit 22 is a communication interface that mediates communication with another device. The communication unit 22 supports an arbitrary wireless communication protocol or a wired communication protocol, and establishes communication connection with another device via the communication network 5 illustrated in FIG. 1, for example. This enables the server 2 to receive label information from the client terminal 1 connected to the communication network 5, and transmit graph information and a display size to the client terminal 1, for example.

The storage unit 24 stores programs and parameters for causing the configurations of the server 2 to function. In addition, the storage unit 24 stores image data for learning, and label information received from the client terminal 1.

2. OPERATION EXAMPLE

The configuration example of the information processing system 1000 according to the present embodiment has been described above. Subsequently, an operation example of the information processing system 1000 according to the present embodiment will be described with reference to FIGS. 3 to 10. In the following description, first of all, a process flow of the information processing system 1000 will be described with reference to FIG. 3, and then, transition examples of screens to be displayed on the client terminal 1 in the present embodiment will be described with reference to FIGS. 4 to 10.

2-1. Process Flow

Figure 3:
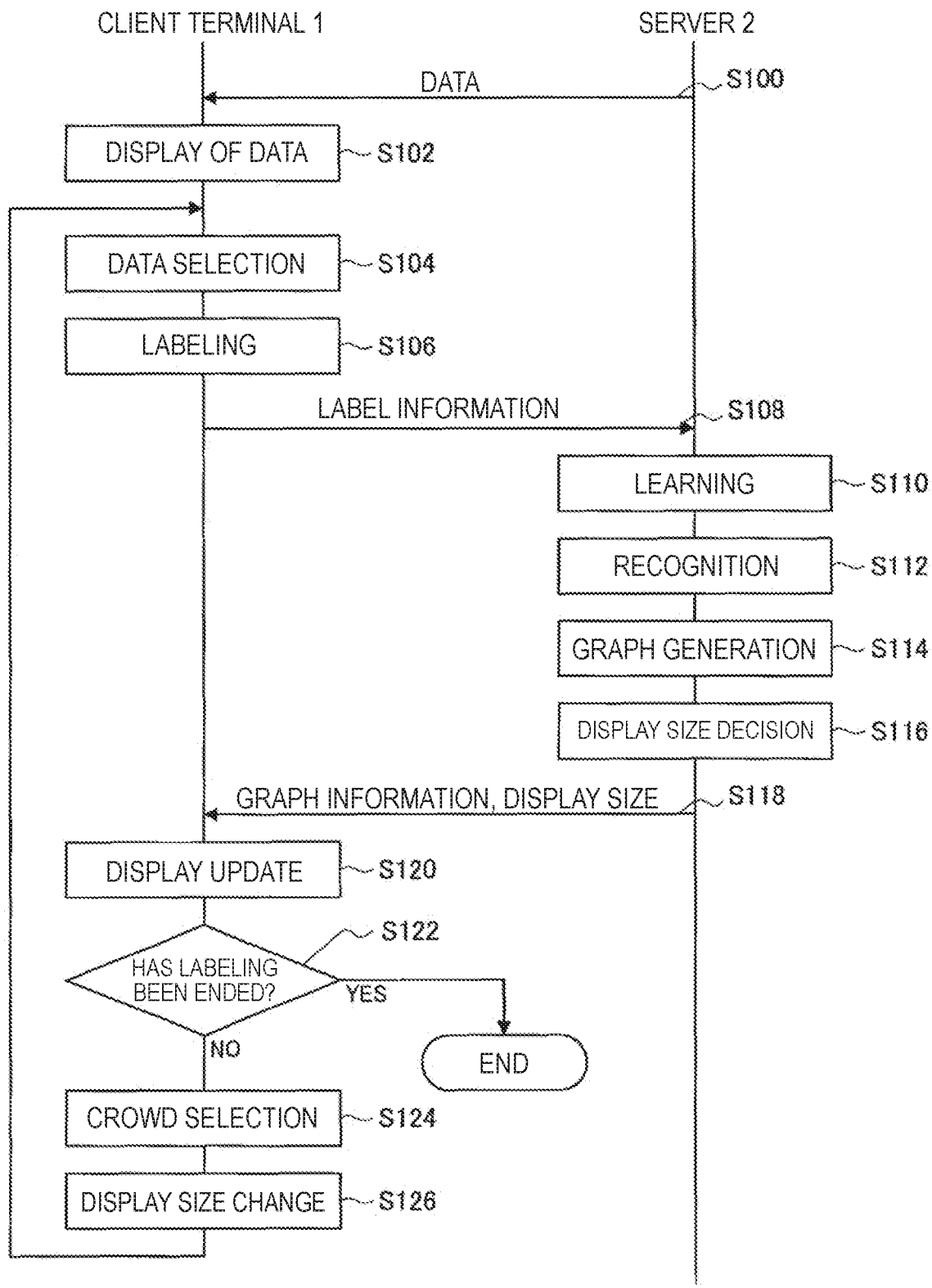
FIG. 3 is a sequence diagram illustrating a process flow of the information processing system 1000 according to this embodiment.

FIG. 3 is a sequence diagram illustrating a process flow of the information processing system 1000 according to the present embodiment.

As illustrated in FIG. 3, first of all, image data for learning are transmitted from the server 2 to the client terminal 1 (S100). Subsequently the client terminal 1 displays the image data (S102). Note that, in step S102, because labels are not granted to the image data, and in addition, recognition in the server 2 is not performed, the image data may be displayed all in the same display size at random positions, for example.

Subsequently, by the user operating the client terminal 1, image data to be labeled is selected (S104). Subsequently, a label is affixed to the image data selected in step S104 (S106). In step S106, for example, labeling may be performed by the user inputting a label, or labeling may be performed by the user selecting a label from among labels that have been prepared in advance or already input by the user.

Note that, in steps S104 and S106, labeling may be performed after selecting a plurality of image data, or labeling for a plurality of labels may be performed by repeating steps S104 and S106.

Subsequently, label information obtained by the labeling in step S106 is transmitted from the client terminal 1 to the server 2 (S108). The learning unit 202 of the server 2 that has received the label information performs learning using the labeled image data (S110). Furthermore, the recognition unit 203 of the server 2 identifies a likelihood vector related to the image data, on the basis of the learning result in step S110, and recognizes (classifies) the image data on the basis of the likelihood vector (S112).

Subsequently, the arrangement control unit 204 of the server 2 arranges a class and image data by generating a graph on the basis of the likelihood vector (S114). On the basis of the positions of the arranged class and image data, the display size decision unit 205 of the server 2 decides a display size (S116).

Subsequently, information regarding the graph generated in step S114 (graph information), and the display size decided in step S116 are transmitted from the server 2 to the client terminal 1 (S118). The client terminal 1 that has received the graph information and the display size updates the display such that the class and the image data are displayed at the positions at which the class and the image data are arranged in step S114 (S120).

In a case where it is selected that the labeling has ended, by the operation of the user that has checked the display (YES in S122), the process ends. Note that, in this case, the server 2 may be notified that the labeling has ended, and a label corresponding to a class to which each piece of image data belongs at the present moment may be affixed as a label of the image data.

In a case where it is selected in step S122 that the labeling has not ended (NO in S122), a crowd including image data on which the user desires to perform labeling is selected by the user operating the client terminal 1 (S124).

Subsequently, the display control unit 103 of the client terminal 1 changes a display size of image data included in the selected crowd, to the display size received from the server 2 in step S118 (S126). Subsequently, the process returns to step S104, and is repeated until it is selected by the user that the labeling has ended.

2-2. Screen Transition Example

The process flow of the information processing system 1000 according to the present embodiment has been described above. Subsequently, a specific example of the transition of screens to be displayed on the client terminal 1 in a case where image data is to be labeled will be described with reference to FIGS. 4 to 10. FIGS. 4 to 10 are explanatory diagrams illustrating examples of screens that the display control unit 103 of the client terminal 1 according to the present embodiment causes the display unit 14 to display. Note that, the following description will be given with appropriately referring to the process steps illustrated in FIG. 3.

Figure 4:
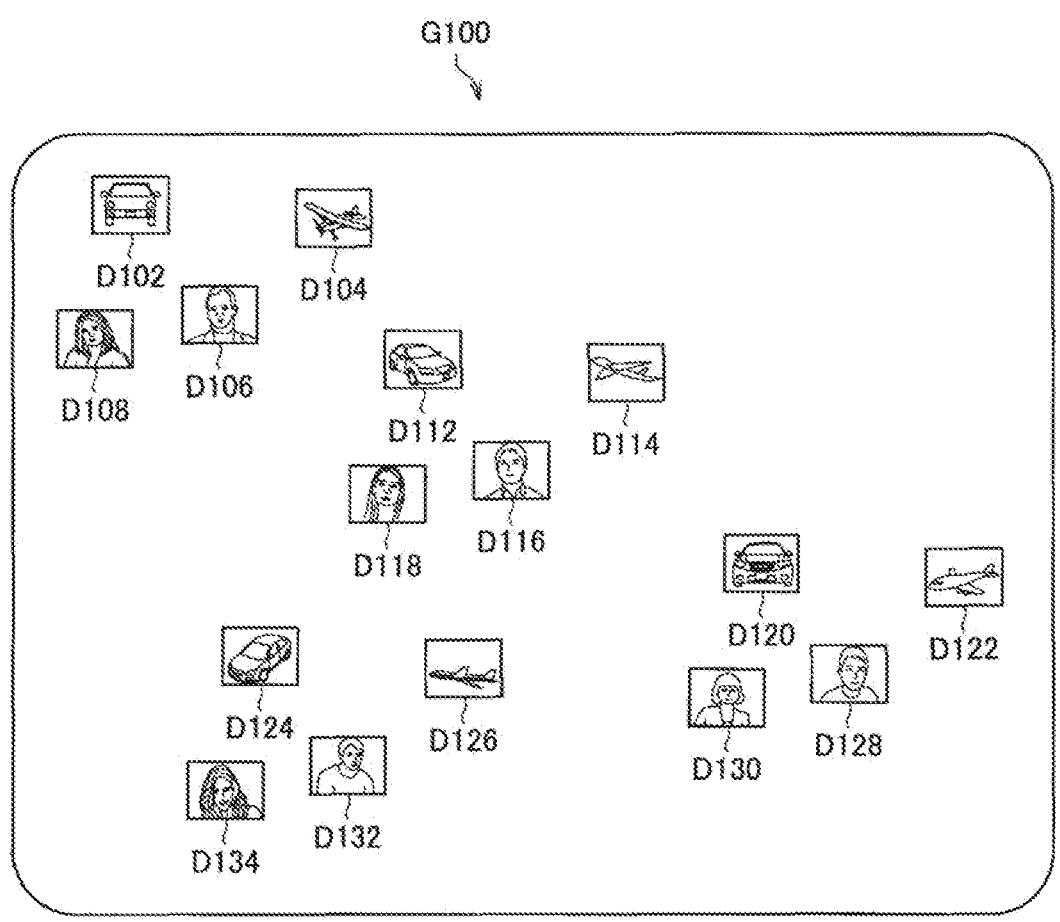
FIG. 4 is an explanatory diagram illustrating a screen example according to this embodiment.

First of all, in step S102 in FIG. 3, image data D102 to D134 are displayed all in the same display size at random positions as in a screen G100 illustrated in FIG. 4.

Figure 5:
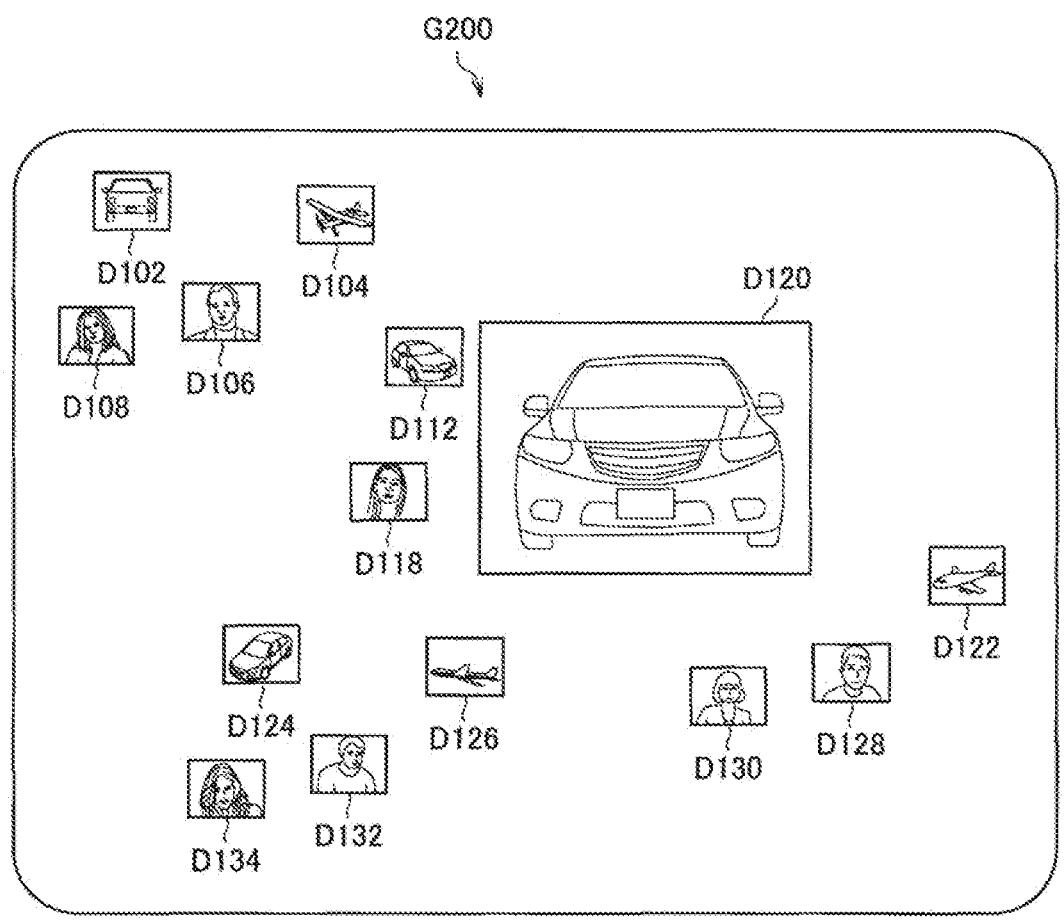
FIG. 5 is an explanatory diagram illustrating a screen example according to this embodiment.

Subsequently, when the image data D120 is selected in step S104 in FIG. 3, as in a screen G200 illustrated in FIG. 5, the image data D120 is enlarged, and it becomes possible to label the image data D120. By the selected image data D120 being enlarged, it becomes easier for the user to perform labeling while checking the details of the image data D120.

In the following description, the description will be continued assuming that the user has affixed a label "Car" to the image data D120 on the screen G200 illustrated in FIG. 5.

Figure 6:
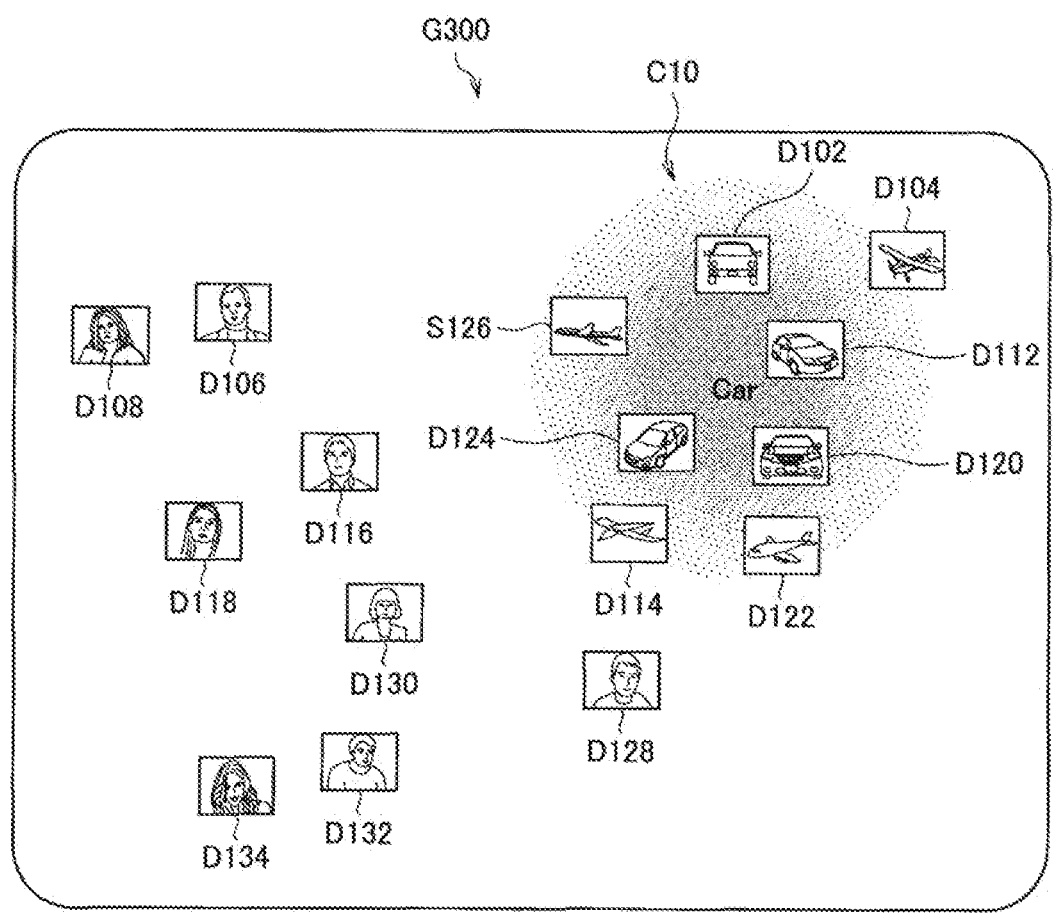
FIG. 6 is an explanatory diagram illustrating a screen example according to this embodiment.

After the processes in steps S106 to S118 in FIG. 3 have been performed, in step S120 in FIG. 3, the display is updated as in a screen G300 illustrated in FIG. 6. On the screen G300 illustrated in FIG. 6, a crowd C10 corresponding to the class Car is displayed, and the image data D102, D104, D112. D114. D120, D122, D124, and D126 that belong to the class Car are displayed in the crowd C10. In addition, image data having a low likelihood related to the class Car corresponding to the crowd C10, and a high possibility of being falsely recognized are prone to be displayed at positions far from the center position of the crowd C10 (the position of the class Car).

Figure 7:
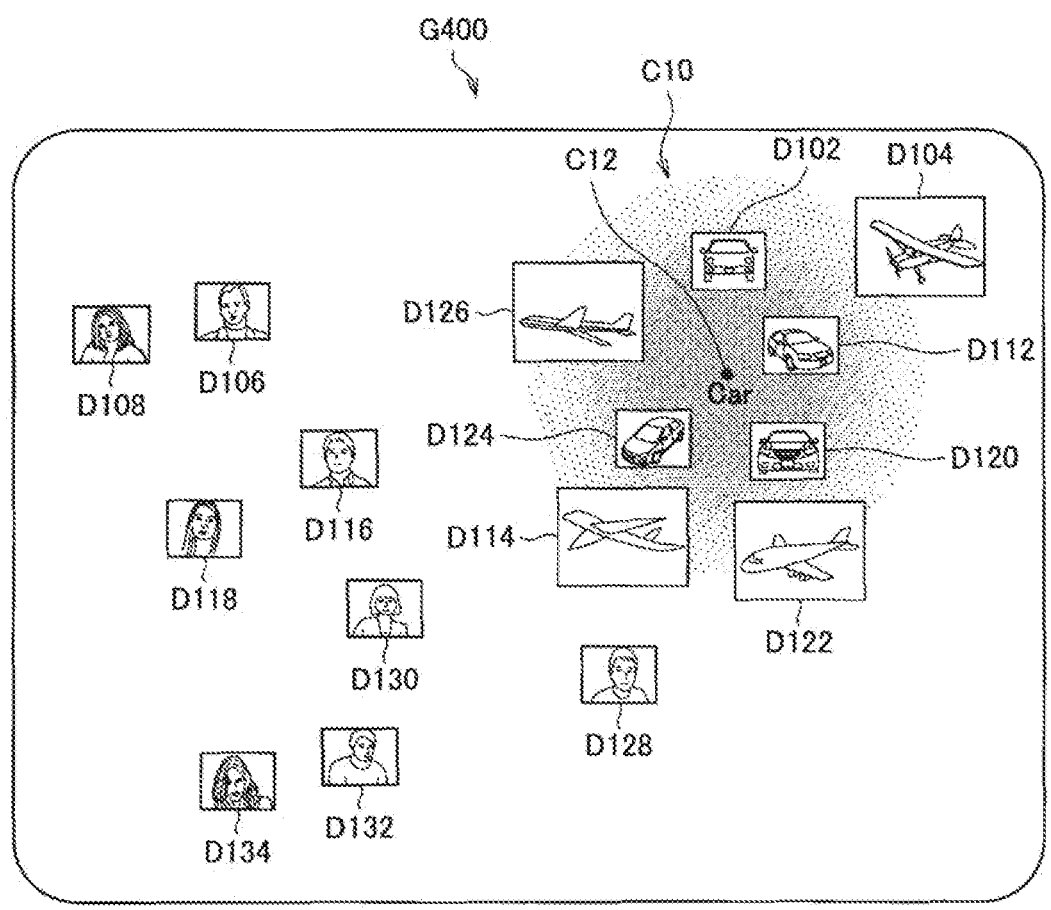
FIG. 7 is an explanatory diagram illustrating a screen example according to this embodiment.

Subsequently, when a crowd is selected by the user in step S124 in FIG. 3, in step S126 in FIG. 3, the display sizes of image data are changed as in a screen G400 illustrated in FIG. 7. In the example of the screen G400 illustrated in FIG. 7, the image data D104, D114, D122, and D126 that are arranged at positions far from a center position C12 of the crowd C10 (position of the class Car) are displayed in a display size larger than that of the other image data. With this configuration, image data having a high possibility of being falsely recognized are displayed in a large display size. It therefore becomes possible for the user to check the image data displayed in the large display size, and select data desired to be correctly labeled, more easily.

Figure 8:
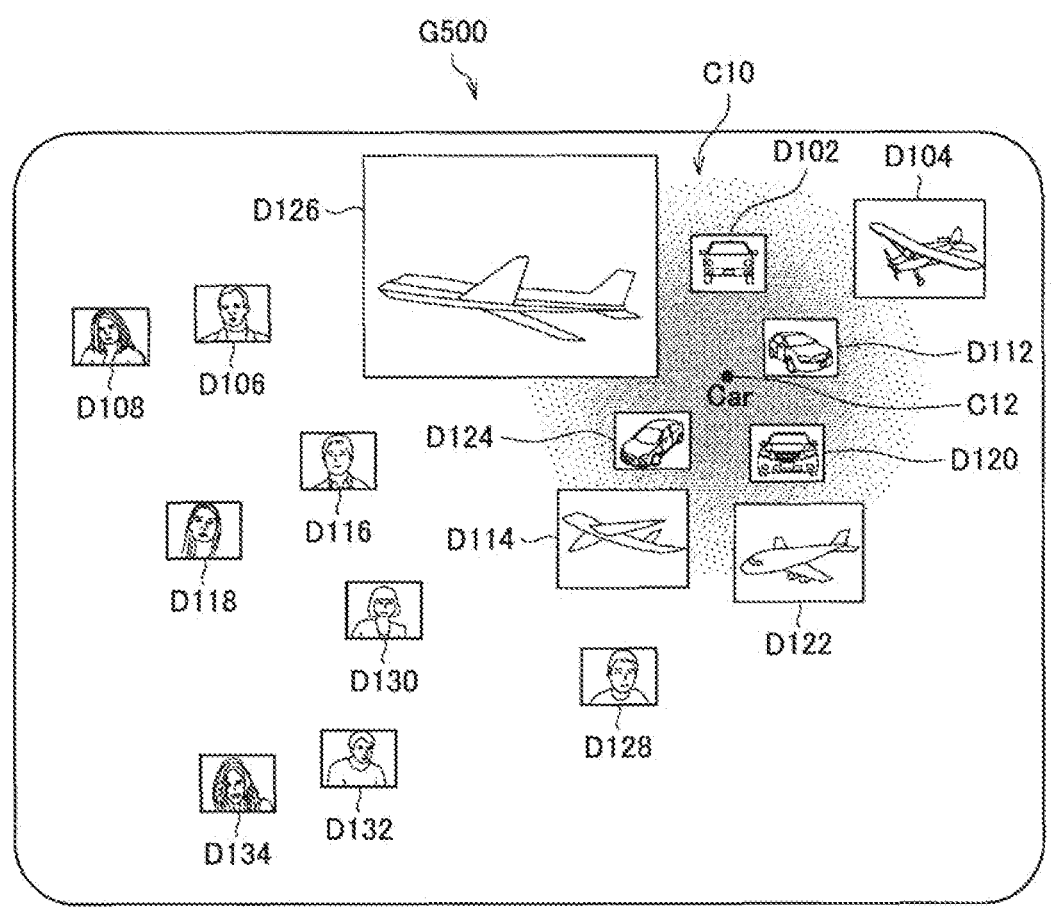
FIG. 8 is an explanatory diagram illustrating a screen example according to this embodiment.

The process returns to step S104 in FIG. 3, and when the image data D126 is selected, as in a screen G500 illustrated in FIG. 8, the image data D126 is enlarged, and it becomes possible to label the image data D126.

In the following description, the description will be continued assuming that the user has affixed a label "Plane" to the image data D126 on the screen G500 illustrated in FIG. 8.

Figure 9:
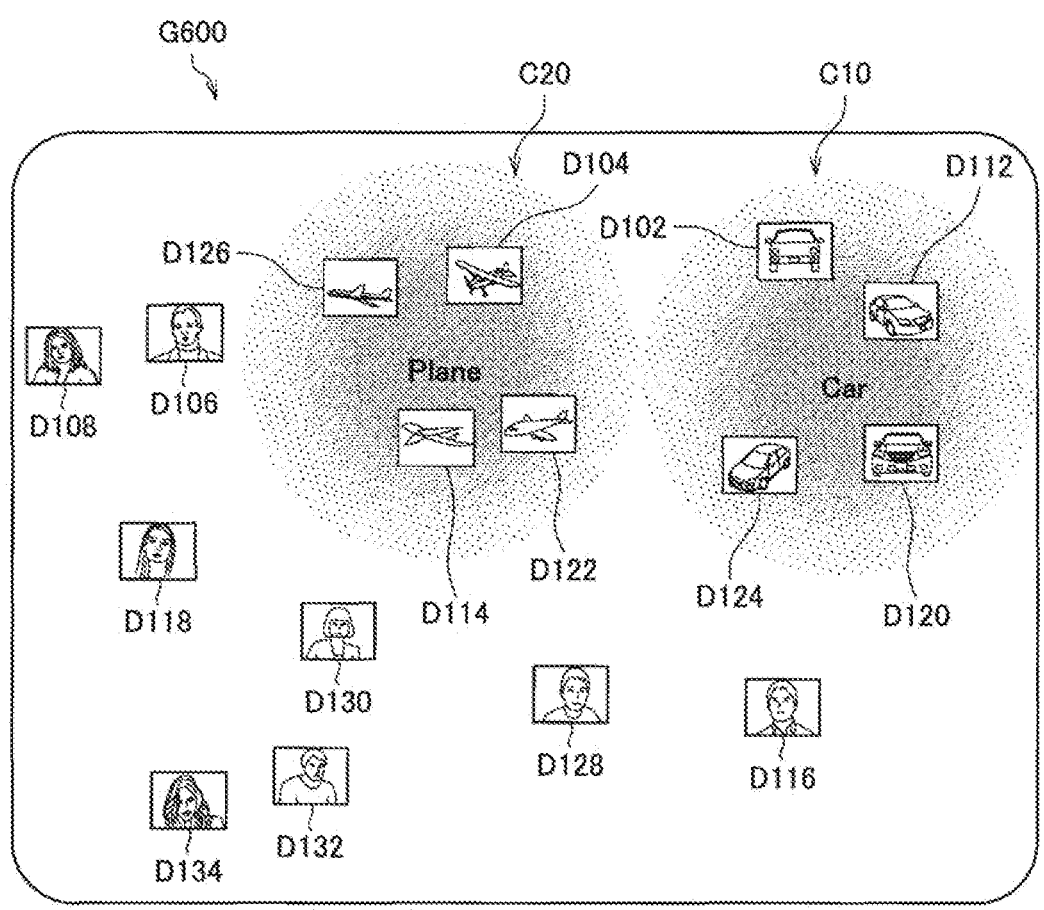
FIG. 9 is an explanatory diagram illustrating a screen example according to this embodiment.
Figure 10:
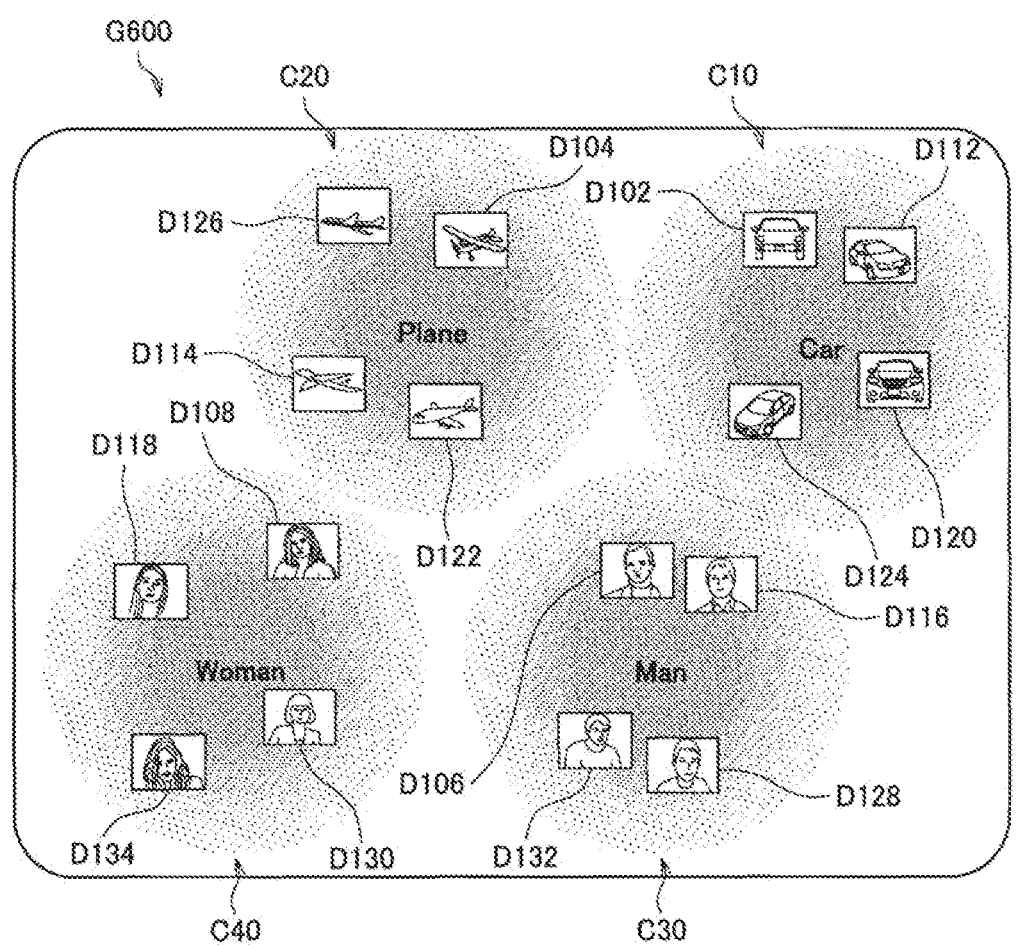
FIG. 10 is an explanatory diagram illustrating a screen example according to this embodiment.

After the processes in steps S106 to S118 in FIG. 3 have been performed again, in step S120 in FIG. 3, the display is updated as in a screen G600 illustrated in FIG. 9. On a screen G600 illustrated in FIG. 9, the crowd C10 corresponding to the class Car, and a crowd C20 corresponding to the class Plane are displayed. In addition, as illustrated in FIG. 9, the image data D102, D112, D120, and D124 that belong to the class Car are displayed in the crowd C10, and the image data D104, D114, D122, and D126 that belong to the class Plane are displayed in the crowd C20. In addition, image data having a low likelihood related to a class corresponding to each crowd, and a high possibility of being falsely recognized are prone to be displayed at positions far from the center position of each crowd.

By repeating the labeling as described above, as in a screen G600 illustrated in FIG. 10, all the image data are included in any of crowds C10, C20, C30, and C40. For example, in step S122 in FIG. 3, the user checks the screen G600, and selects that the labeling has ended.

3. MODIFIED EXAMPLE

An embodiment of the present disclosure has been described above. In the following description, several modified examples of an embodiment of the present disclosure will be described. Note that, modified examples to be described below may be individually applied to an embodiment of the present disclosure, or may be applied to an embodiment of the present disclosure in combination. In addition, each modified example may be applied in place of a configuration described in the embodiment of the present disclosure, or may be applied additionally to the configuration described in the embodiment of the present disclosure.

3-1. Modified Example 1

In the above-described embodiment, the description has been given of an example in which, after the crowd is selected in step S124, the display size of the image data included in the selected crowd is changed to the display size received from the server 2 (S126). Nevertheless, the present technology is not limited to this example.

For example, at the time of display update in step S120, a display size of each piece of image data may be changed to the display size received from the server 2. In addition, in step S124, a range in a screen may be selected in place of a crowd, and the display size of image data included in the selected range may be changed to the display size received from the server 2. In addition, in step S124, image data may be selected in place of a crowd, and the display size of the selected image data may be changed to the display size received from the server 2.

3-2. Modified Example 2

In addition, in the above-described embodiment, the description has been given of an example in which, in an initial state in which labeling has never been performed (step S102, screen G100), the image data are displayed all in the same display size at random positions. Nevertheless, the present technology is not limited to this example. For example, by an unsupervised learning method such as k-means clustering, a result obtained by clustering image data may be displayed in step S102.

With this configuration, even in an initial state in which labeling has never been performed, image data are displayed with being clustered. It therefore becomes easier for the user to select image data in the case of selecting a plurality of image data and affixing the same label thereto. Note that, the above-described clustering may be performed by the recognition unit 203 of the server 2, for example.

3-3. Modified Example 3

In addition, in the above-described embodiment, the description has been given of an example in which the arrangement control unit 204 arranges a class and image data by generating a graph that is based on a mechanical model (force-directed graph). Nevertheless, the present technology is not limited to this example.

For example, on the basis of a magnitude of a likelihood related to a class to which image data belongs that is included in a likelihood vector of the image data, a distance between the class and the image data may be decided. Furthermore, on the basis of a magnitude of a likelihood related to a class other than the class that is included in the likelihood vector of the image data, an angle of the image data viewed from the class may be decided.

3-4. Modified Example 4

In addition, in the above-described embodiment, the functions of the client terminal 1 and the server 2 have been described with reference to FIGS. 1 and 2. Nevertheless, the present technology is not limited to this example. For example, the server 2 may have the functions of the client terminal 1 that have been described in the above-described embodiment, or the client terminal 1 may have the functions of the server 2 that have been described in the above-described embodiment. In the following description, as a modified example, the description will be given of an example in which a client terminal has the functions of the arrangement control unit and the display size decision unit that have been described in the above-described embodiment.

Figure 11:
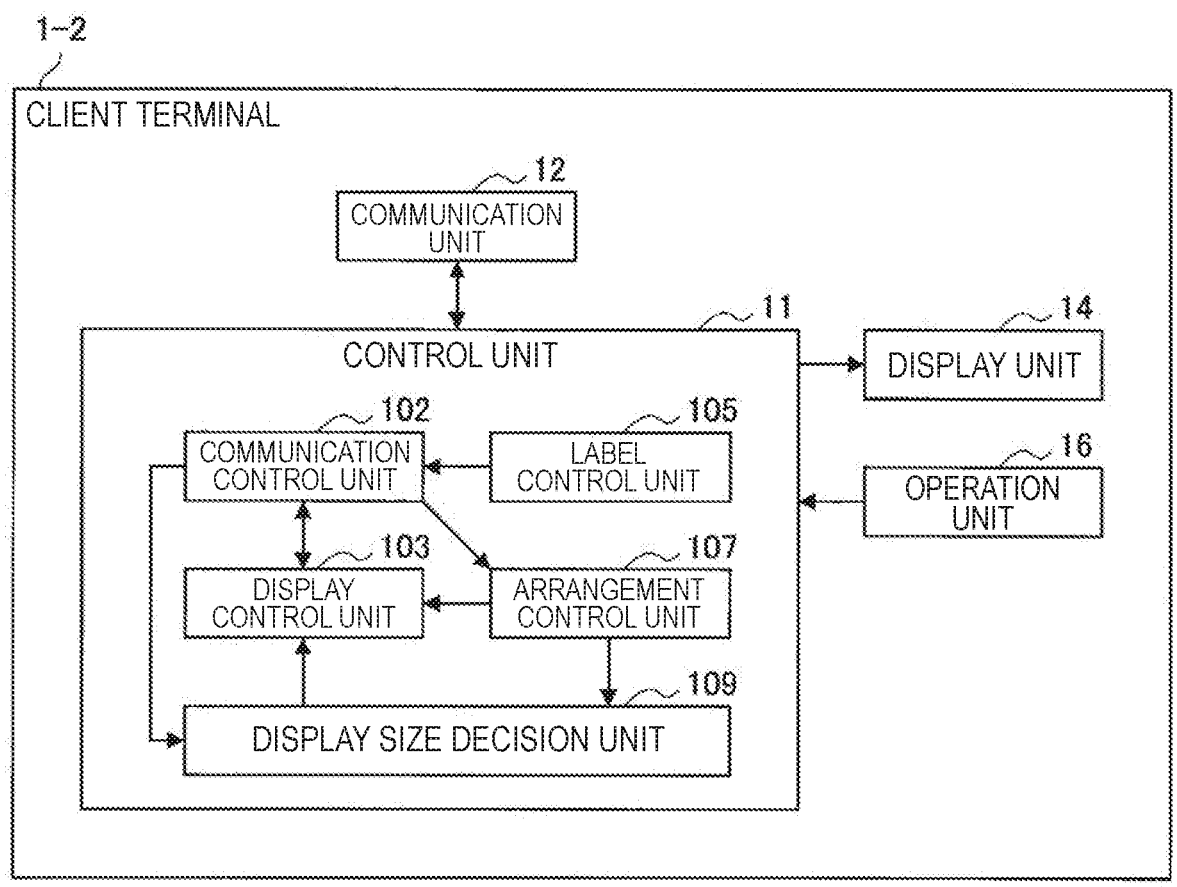
FIG. 11 is an explanatory diagram for describing a configuration example of a client terminal 1-2 according to a modified example.

FIG. 11 is an explanatory diagram for describing a configuration example of a client terminal 1-2 according to this modified example. As illustrated in FIG. 11, the client terminal 1-2 is an information processing apparatus including a control unit 11, the communication unit 12, the display unit 14, and the operation unit 16. Note that, among the configurations illustrated in FIG. 11, configurations substantially similar to the respective configurations illustrated in FIG. 1 are denoted with the same reference numerals. Thus, the description thereof will be omitted.

The control unit 11 controls each configuration of the client terminal 1-2. In addition, as illustrated in FIG. 11, the control unit 11 also functions as a communication control unit 102, the display control unit 103, the label control unit 105, an arrangement control unit 107, and a display size decision unit 109.

Similarly to the communication control unit 101 described with reference to FIG. 1, the communication control unit 102 controls communication performed by the communication unit 12. For example, the communication control unit 102 controls the communication unit 12 to receive image data, a likelihood vector, and the like from the server 2. In addition, the communication control unit 102 controls the communication unit 12 to transmit label information to the server 2.

In addition, the communication control unit 102 may control communication performed between units included in the control unit 11. For example, the communication control unit 102 may control communication performed between the arrangement control unit 107 and the display size decision unit 109, and communication performed between the arrangement control unit 107 and the display control unit 103, and cause graph information to be transmitted from the arrangement control unit 107 to the display size decision unit 109 and the display control unit 103. In addition, the communication control unit 102 may control communication performed between the display size decision unit 109 and the display control unit 103, and cause a display size to be transmitted from the display size decision unit 109 to the display control unit 103.

The arrangement control unit 107 performs the arrangement of image data and a class on the basis of a likelihood vector received from the server 2. An arrangement method of image data and a class that is used by the arrangement control unit 107 is similar to the arrangement method used by the arrangement control unit 204 that has been described with reference to FIG. 2, for example. Thus, the description thereof will be omitted.

The display size decision unit 109 decides a display size of image data on the basis of a distance between a position of the image data arranged by the arrangement control unit 107, and a position of a class to which the image data belongs. For example, in response to a change of a display target (e.g. enlargement, move, rotation, etc. of a display target range) that has been received by the operation unit 16 (input unit), the display size decision unit 109 may decide a display size of image data included in the display target. With this configuration, the client terminal 1-2 can decide a display size and update the display without communicating with the server 2, in a case where a change of a display target is input without involving the update of a label. Note that, a display size decision method used by the display size decision unit 109 is similar to the display size decision method used by the display size decision unit 205 that has been described with reference to FIG. 2, for example. Thus, the description thereof will be omitted.

4. HARDWARE CONFIGURATION EXAMPLE

Figure 12:
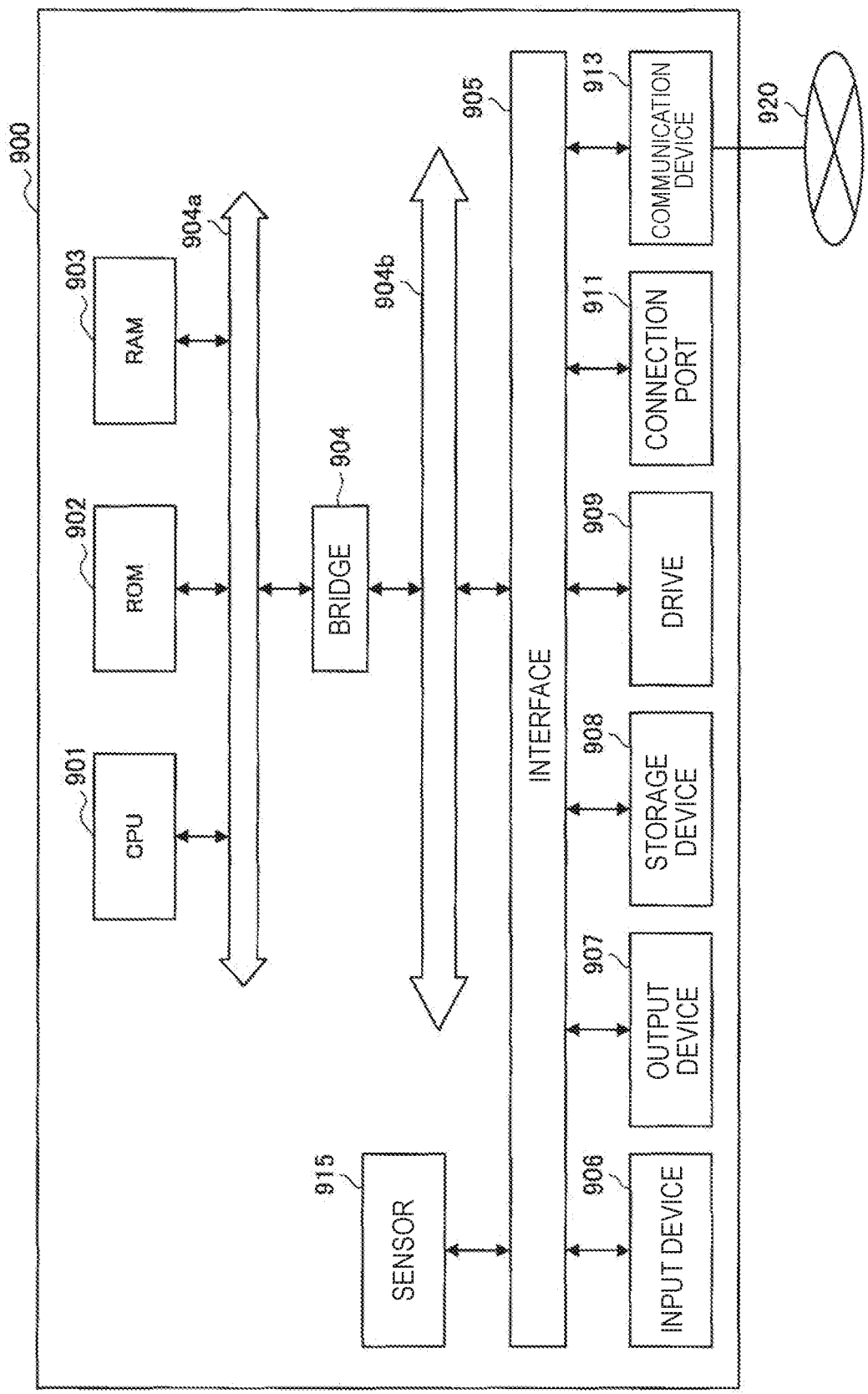
FIG. 12 is an explanatory diagram illustrating a hardware configuration example.

The embodiment of the present disclosure has been described hitherto. Finally, a hardware configuration of an information processing apparatus according to the present embodiment will be described with reference to FIG. 12. FIG. 12 is a block diagram illustrating an example of the hardware configuration of the information processing apparatus according to the present embodiment. Meanwhile, an information processing apparatus 900 illustrated in FIG. 12 may realize the client terminal 1, the server 2, or the client terminal 1-2 illustrated in each of FIGS. 1, 2, and 11, for example. Information processing by the client terminal 1, the server 2, or the client terminal 1-2 according to the present embodiment is realized according to cooperation between software and hardware described below.

As illustrated in FIG. 12, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control unit 10 illustrated in FIG. 1, the control unit 20 illustrated in FIG. 2, or the control unit 11 illustrated in FIG. 11, for example.

The CPU 901, the ROM 902, and the RAM 903 are mutually connected by the host bus 904a including a CPU bus and the like. The host bus 904a is connected with the external bus 904b such as a peripheral component interconnect/interface (PCI) bus via the bridge 904. Further, the host bus 904a, the bridge 904, and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906. The input device 906 can form the operation unit 16 illustrated in FIG. 1, for example.

The output device 907 is formed by a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals. The aforementioned display device may form the display unit 14 illustrated in FIG. 1, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form the storage unit 24 illustrated in FIG. 2, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication apparatuses according to a predetermined protocol such as, for example, TCP/IP. The communication device 913 may form the communication unit 12 illustrated in FIGS. 1 and 11, and the communication unit 22 illustrated in FIG. 2, for example.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900, and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device.

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

5. CONCLUSION

As described above, according to an embodiment of the present disclosure, data can be labeled more efficiently.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the above description, an example in which data to be labeled is image data has been described. Nevertheless, the present technology is not limited to this example. For example, data to be labeled may be text data, voice data, and the like. For example, in a case where recognition target data is text data, a display size of text data (character size) may be decided by the display size decision unit.

In addition, steps in the above-described embodiment need not be always processed in chronological order in accordance with the order described as a sequence diagram. For example, steps in the processes in the above-described embodiment may be processed in an order different from the order described as a sequence diagram, or may be concurrently processed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a display size decision unit configured to decide a display size of data that is based on learning of a label corresponding to a class, on the basis of a distance between a position of the data arranged on the basis of a likelihood vector obtained by recognition of the data, and a position of a class to which the data belongs; and a communication control unit configured to cause the display size to be transmitted.

(2)

The information processing apparatus according to (1), in which the display size decision unit decides the display size such that the display size becomes larger as the distance from the position of the class to which the data belongs becomes larger.

(3)

The information processing apparatus according to (1) or (2), in which the display size decision unit decides the display size further on the basis of a radius of a circle indicating a range of the class.

(4)

The information processing apparatus according to (3), in which the display size decision unit decides the display size such that the display size becomes larger as a ratio of the distance with respect to the radius becomes larger.

(5)

The information processing apparatus according to (3), in which the display size decision unit decides the display size such that the display size becomes larger in a case where a ratio of the distance with respect to the radius is larger than a predetermined threshold value.

(6)

The information processing apparatus according to any one of (1) to (5), further including:

an arrangement control unit configured to arrange the data, in which the arrangement control unit arranges the data by generating a graph using the class and the data as vertexes.

(7)

The information processing apparatus according to (6), in which the arrangement control unit generates the graph on the basis of a mechanical model.

(8)

The information processing apparatus according to (7), in which the arrangement control unit allocates force that is based on the likelihood vector, to a side between the class and the data.

(9)

The information processing apparatus according to (8), in which the arrangement control unit allocates the force such that the force to be allocated to the side between the class and the data becomes larger as a likelihood related to the class in the likelihood vector becomes larger.

(10)

The information processing apparatus according to any one of (6) to (9), in which the arrangement control unit allocates, to a side between classes, force that is based on a similarity degree between the classes.

(11)

The information processing apparatus according to (10), in which the arrangement control unit allocates the force such that the force to be allocated to the side between the classes becomes larger as the similarity degree between the classes becomes larger.

(12)

The information processing apparatus according to any one of (1) to (11), further including:

a display control unit configured to cause the data to be displayed in the display size.

(13)

The information processing apparatus according to any one of (1) to (12), in which the data includes image data.

(14)

An information processing apparatus including:

a receiving unit configured to receive a display size of data that is based on learning of a label corresponding to a class, the display size having been decided on the basis of a distance between a position of the data arranged on the basis of a likelihood vector obtained by recognition of the data, and a position of a class to which the data belongs; and a processing unit configured to perform processing on the basis of the display size.

(15)

An information processing method including:

deciding, by a processor, a display size of data that is based on learning of a label corresponding to a class, on the basis of a distance between a position of the data arranged on the basis of a likelihood vector obtained by recognition of the data, and a position of a class to which the data belongs; and causing the display size to be transmitted.

(16)

An information processing apparatus including:

an input unit configured to receive a change of a display target; and a display size decision unit configured to decide, in response to the change of the display target, a display size of data that is based on learning of a label corresponding to a class, on the basis of a distance between a position of the data arranged on the basis of a likelihood vector obtained by recognition of the data, and a position of a class to which the data belongs.

(17)

An information processing method including:

receiving a change of a display target; and deciding, by a processor, in response to the change of the display target, a display size of data that is based on learning of a label corresponding to a class, on the basis of a distance between a position of the data arranged on the basis of a likelihood vector obtained by recognition of the data, and a position of a class to which the data belongs.

REFERENCE SIGNS LIST 1 client terminal
2 server
5 communication network
10, 11 control unit
12 communication unit
14 display unit
16 operation unit
20 control unit
22 communication unit
24 storage unit
101, 102 communication control unit
103 display control unit
105 label control unit
107 arrangement control unit
109 display size decision unit
201 communication control unit
202 learning unit
203 recognition unit
204 arrangement control unit
205 display size decision unit

The invention claimed is:

1. An information processing apparatus comprising:
a display size decision unit configured to decide a display size of each piece of a plurality of pieces of image data that is based on learning of a label corresponding to a class into which a selected piece among the plurality of pieces of image data is classified, wherein the display size of each respective piece of the image data is decided according to a respective likelihood vector obtained by recognition of the image data, the respective likelihood vector indicating a distance between a position of the respective piece of the image data arranged based on the recognition of the image data and a position of the class into which the selected piece of the image data is classified; and
a communication control unit configured to cause the decided display size of each piece of the image data to be transmitted,
wherein the display size decision unit and the communication control unit are each implemented via at least one processor.

2. The information processing apparatus according to claim 1, wherein the display size decision unit decides the display size such that the display size becomes larger as the distance between the respective piece of image data and the position of the class into which the selected piece of image data is classified becomes larger.

3. The information processing apparatus according to claim 1, wherein the display size decision unit decides the display size further on a basis of a radius of a circle indicating a range of the class.

4. The information processing apparatus according to claim 3, wherein the display size decision unit decides the display size such that the display size becomes larger as a ratio of the distance with respect to the radius becomes larger.

5. The information processing apparatus according to claim 3, wherein the display size decision unit decides the display size such that the display size becomes larger in a case where a ratio of the distance with respect to the radius is larger than a predetermined threshold value.

6. The information processing apparatus according to claim 1, further comprising:
an arrangement control unit configured to arrange the image data,
wherein the arrangement control unit arranges the image data by generating a graph using the class and the image data as vertexes, and
wherein the arrangement control unit is implemented via at least one processor.

7. The information processing apparatus according to claim 6, wherein the arrangement control unit generates the graph on a basis of a mechanical model.

8. The information processing apparatus according to claim 7, wherein the arrangement control unit allocates force that is based on the likelihood vector, to a side between the class and the image data.

9. The information processing apparatus according to claim 8, wherein the arrangement control unit allocates the force such that the force to be allocated to the side between the class and the image data becomes larger as a likelihood related to the class in the likelihood vector becomes larger.

10. The information processing apparatus according to claim 6, wherein the arrangement control unit allocates, to a side between classes, force that is based on a similarity degree between the classes.

11. The information processing apparatus according to claim 10, wherein the arrangement control unit allocates the force such that the force to be allocated to the side between the classes becomes larger as the similarity degree between the classes becomes larger.

12. The information processing apparatus according to claim 1, further comprising:
a display control unit configured to cause the image data to be displayed in the display size,
wherein the display control unit is implemented via at least one processor.

13. The information processing apparatus according to claim 1, wherein the selected piece of the image data is enlarged upon selection until the label is affixed to the selected piece of the image data.

14. An information processing apparatus comprising:
a receiving unit configured to receive a display size of each piece of a plurality of pieces of image data that is based on learning of a label corresponding to a class into which a selected piece among the plurality of pieces of image data is classified, wherein the display size of each respective piece of the image data is decided according to a respective likelihood vector obtained by recognition of the image data, the respective likelihood vector indicating a distance between a position of the respective piece of the image data arranged based on the recognition of the image data and a position of the class into which the selected piece of the image data is classified; and
a processing unit configured to perform processing on a basis of the decided display size of the image data,
wherein the receiving unit and the processing unit are each implemented via at least one processor.

15. An information processing method comprising:
deciding, by a processor, a display size of each piece of a plurality of pieces of image data that is based on learning of a label corresponding to a class into which a selected piece among the plurality of pieces of image data is classified, wherein the display size of each respective piece of the image data is decided according to a respective likelihood vector obtained by recognition of the image data, the respective likelihood vector indicating a distance between a position of the respective piece of the image data arranged based on the recognition of the image data and a position of the class into which the selected piece of the image data is classified; and
causing the decided display size of the image data to be transmitted.

16. An information processing apparatus comprising:
an input unit configured to receive a change of a display target; and
a display size decision unit configured to decide, in response to the change of the display target, a display size of each piece of a plurality of pieces of image data that is based on learning of a label corresponding to a class into which the display target is classified, wherein the display size of each respective piece of the image data is decided according to a respective likelihood vector obtained by recognition of the image data, the respective likelihood vector indicating a distance between a position of the respective piece of the image data arranged based on the recognition of the image data, and a position of a class into which the respective piece of the image data is classified based on the learning of the label corresponding to the class into which the display target is classified,
wherein the input unit and the display size decision unit are each implemented via at least one processor.

17. An information processing method comprising:
receiving a change of a display target; and
deciding, by a processor, in response to the change of the display target, a display size of each piece of a plurality of pieces of image data that is based on learning of a label corresponding to a class into which the display target is classified, wherein the display size of each respective piece of the image data is decided according to a respective likelihood vector obtained by recognition of the image data, the respective likelihood vector indicating a distance between a position of the respective piece of the image data arranged based on the recognition of the image data and a position of a class into which the respective piece of the image data is classified based on the learning of the label corresponding to the class into which the display target is classified.

* * * * *